Patented July 2, 1946

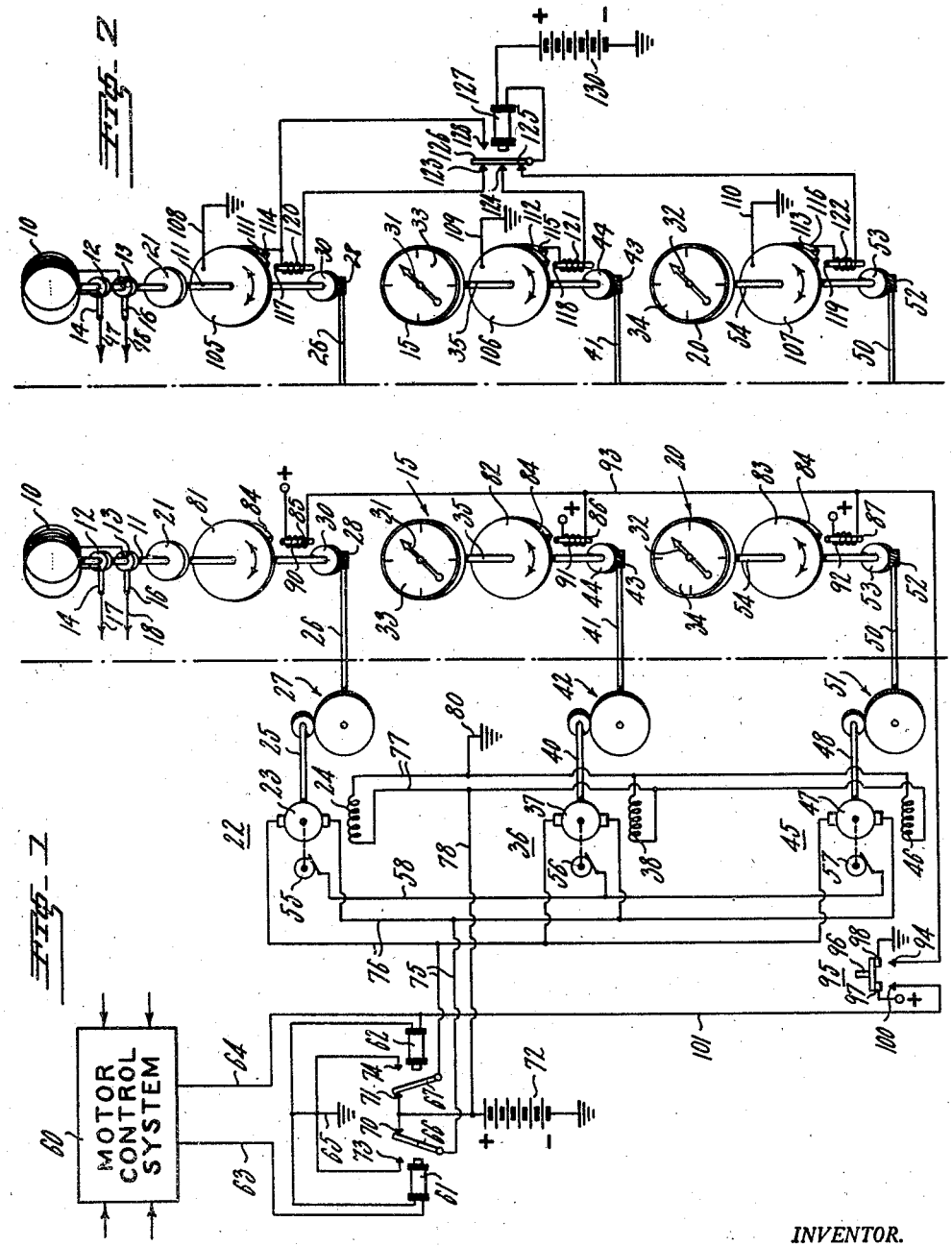

2,403,098

UNITED STATES PATENT OFFICE 2,403,098

AUTOMATIC MOTOR SYNCHRONIZATION CONTROL

William P. Lear, North Hollywood, Calif., assignor, by mesne assignments, to Lear, Incorporated, Grand Rapids, Mich., a corporation of Illinois Application February 3, 1944, Serial No. 520,895

15 Claims. (Cl. 172—239)

This invention relates to a reset synchronizing system, and more particularly to such a system wherein movable members may be manually or automatically aligned at a predetermined point in their path of travel.

The present invention is particularly useful for controlling the position of accessories aboard an aircraft. Aboard the larger airplanes, indications of the readings of a master instrument are usually repeated at various points throughout the aircraft. Generally, where the number of repeating instruments is not large, a telemetering system has been used. However, where a relatively large number of repeating instruments are to be synchronized with a master instrument, the load imposed on the telemetering transmitter by the repeating instruments may adversely affect the accuracy of the repeated indications.

For this purpose, the present invention comprises a plurality of remote indicating instruments each of which is separately driven by its own power means. As the power supply aboard aircraft is generally furnished by a 28 volt battery, direct current motors are used as the power means. Synchronizing connections are provided between the direct current motors for the various instruments, to effect synchronous operation of the instruments. Additionally, the present invention contemplates means for manually or automatically checking and restoring align ment between the instruments at predetermined points in the path of travel of the indicating elements.

It is among the objects of this invention to provide a reset synchronization system for maintaining alignment between a plurality of movable elements; to provide such a system including independently direct current motor driven movable elements including synchronizing connections between the motors for all the elements; to provide such a system including selectively operable means for automatically checking and restoring alignment between the movable elements at a given point in their paths of travel; to provide such a system including means automatically responsive to misalignment between the movable elements for restoring alignment therebetween; and to provide a remote indicating system including independently energized master instrument and repeater instruments, with means for maintaining alignment therebetween and restoring such alignment in the event of misalignment.

These and other objects, advantages and features of this invention will be apparent from the following description and accompanying drawing. In the drawing:

Fig. 1 is a schematic view illustrating one embodiment of the invention.

Fig. 2 is a schematic representation of a portion of another embodiment of the invention.

Referring to Fig. 1, the invention is illustrated as employed for repeating the bearing indications of a rotatable loop antenna 10 which may form part of an automatic radio direction finding system such as illustrated in my Patent No. 2,308,521, issued January 19, 1943, for "Automatic radio direction indicator" which is assigned to the same assignee as this application. Remote indicators 15 and 20 are provided for repeating the bearing indications of antenna 10 at points remote with respect to the antenna. The antenna 10 is mounted on a shaft 11 and has a closed loop or coil winding connected to slip rings 12 and 13. Brushes 14 and 16 engage rings 12 and 13 and are connected to leads 17 and 18, which conduct the signals received by antenna 10 to the input of a suitable directional receiving system, not shown. A quadrantal error compensator, diagrammatically illustrated at 21, is provided for correcting for the quadrantal errors in the directional indications of antenna 10, before such bearing indications are transmitted to further associated apparatus. The quadrantal error compensator may be of the type disclosed and claimed in my Patent No. 2,336,361 issued December 7, 1943, for "Quadrantal compensators."

A reversible direct current shunt motor 22 having an armature 23 and a shunt field winding 24 is provided to rotate antenna 10. Armature 23 is connected to a shaft 25 which drives a shaft 26 through reduction gearing 27. A worm 28 on shaft 26 engages a worm gear 30 on loop antenna shaft 11. Reduction gearing 27 and worm drive 28 allow a relatively high speed motor to be used for rotating antenna 10 at a moderate rate.

Each remote indicator 15 and 20 comprises a rotatable pointer 31 or 32, respectively, cooperating with a dial 33 or 34. Pointer 31 is mounted on a rotatable shaft 35. A reversible direct current shunt motor 36 having an armature 37 and a shunt field winding 38 is provided to rotate pointer 31. For this purpose, armature shaft 40 drives a shaft 41 through reduction gearing 42. A worm 43 on shaft 41 engages a worm gear 44 on indicator shaft 35. Similarly, a reversible direct current shunt motor 45 is provided to operate indicator 20. Motor 45 includes a shunt field 46 and an armature 47 having a shaft 48 driving a second shaft 50 through reduction gearing 51. A worm 52 on shaft 50 engages a worm gear 53 on indicator shaft 54 connected to rotatable pointer 32.

Synchronizing circuit connections are provided between the several motors 22, 36 and 45 to maintain indicators 15 and 20 in synchronous rotation with antenna 10. The synchronizing connections in the present instance may comprise slip rings 55, 56 and 57, each connected to corresponding points in the armature windings 23, 37 and 47. Brushes engage each of the slip rings and are interconnected through a conductor 58. If desired, more than one slip ring may be provided for each armature winding. With the described arrangement, if there is a discrepancy between relative positions of the motor, a circulating current is set up in conductor 58 which tends to slow down or speed up the motors with respect to the discrepancy in the angular position of the larger motor.

Each of the motors 22, 36 and 45 is arranged to be energized through motor control system 60 which may be the same as the motor control system shown in Fig. 4 of my above referred to Patent No. 2,308,521. As the circuit connections in the motor control system 60 are fully described in said patent, only a diagrammatic representation thereof is here provided. Motor control system 60 is arranged to energize either of a pair of relays 61 or 62, connected to system 60 by conductors 63 and 64, respectively. The opposite terminals of the relays are connected to ground at 65. Relays 61 and 62 have armatures 66 and 67 which normally engage back contacts 70 and 71 connected to the positive terminal of a suitable source of direct current diagrammatically illustrated as a battery 72, which may be the 28 volt aircraft battery. Front contacts 73 and 74 of relays 61 and 62, respectively, are connected to ground 65. Armatures 66 and 67 are connected through conductors 75 to conductors 76. Motor armatures 23, 37 and 47 are connected in parallel across conductors 76.

Field windings 24, 38 and 46 are connected in parallel through conductors 77. One of the conductors 77 is connected by conductor 78 to the positive terminal of battery 72, and the other conductor is connected to ground at 80. A suitable control switch may be provided in the conductor 78 in a well known manner.

The several motors are reversible through reversal of the polarity of the motor armature terminals. The direction of rotation of the motors is controlled by the relays 61 and 62 connected to motor control system 60. As described in my Patent No. 2,308,521, displacement of antenna 10 from a predetermined radio bearing position will cause energization of its associated motor 22 in a direction to rotate the antenna to such bearing direction. For instance, if the control signal is such as to energize relay 61, armature 66 will engage front contact 73, while armature 67 will remain in engagement with back contact 71. This will connect conductors 76 respectively to the positive terminal of battery 72 and to ground, thus energizing motors 22, 36 and 45. Upon deenergization of relay 61, armature 66 engages its back contact 70. A closed circuit is thus provided for the armature windings resulting in rapid dynamic braking action causing substantially instantaneous stoppage of the element driven by each motor, due to generator action of the motors as the fields are still energized. Synchronizing connection 58 maintains synchronous rotation of the motors.

The means for checking and resetting the alignment of antenna 10 and indicators 15 and 20 at predetermined points will now be described. This means comprises rotatable disks 81, 82 and 83, operatively associated with antenna 10, indicator 15 and indicator 20, respectively. Each disk is provided with an abutment 84. Plungers 85, 86 and 87 in operative arrangement with each abutment 84 and are normally in a position where they will not engage the associated abutment. An energizing winding 90, 91 and 92 is provided for each plunger 85, 86 and 87. One terminal of each energizing winding is connected to positive battery supply, as indicated. The other terminals of the windings are connected in parallel to a conductor 93 which is connected to a terminal 94 of a push button 95. Push button 95 comprises a movable member 96 having spaced contacts 97 and 98 connected respectively to the positive battery terminal and to ground. Contact 98 is adapted to connect terminal 94 to ground, and contact 97 is adapted to connect one terminal of relay 62 to the positive battery terminal through terminal 100 and a conductor 101.

The described resetting arrangement operates in the following manner. Upon closing switch 95, relay 62 will be energized through having its terminals connected respectively to ground and to the positive battery terminal. This will in turn energize motors 22, 36 and 45 for rotation in a given direction, such as clockwise. At the same time, solenoid windings 90, 91 and 92 will be energized, as their opposite terminals are connected to ground through conductor 93 and contacts 94 and 98 of switch 95. Energization of the solenoids will move plungers 85, 86 and 87 into the path of movement of abutments 84.

Assume that antenna 10 is out of alignment with indicators 15 and 20, as by being several degrees in advance thereof. Accordingly, abutment 84 on disk 81 will strike plunger 85 and will arrest motion of antenna 10 until the abutments 84 on disks 82 and 83 likewise engage their associated plungers 86 and 87. When all the abutments have engaged their plungers, switch 95 may be opened and the system permitted to operate in the normal manner. The abutments 84 on the several disks are so positioned that when they engage their associated plungers, antenna 10 is aligned with indicators 15 and 20. Normally, such resetting operation need take place only at infrequent intervals, due to the synchronizing circuit connections, including the rings 55, 56, 57 and conductor 58. Such synchronizing circuit connections maintain the direct current motors 22, 36 and 45 in substantial synchronism at all times so that indicators 15 and 20 faithfully repeat the varied indications of antenna 10.

The modified form of the invention illustrated in Fig. 2 operates automatically to cause necessary resetting of the alignment between the antenna and the indicators at least once during each revolution of such elements. To simplify the drawing, the portion of Fig. 1 to the left of the broken vertical line has been omitted in Fig. 2, but it is understood to be the same as that shown in Fig. 1. Likewise, corresponding elements have been given the same reference characters in Fig. 2. Antenna 10 in Fig. 2 is provided with a disk 105, and indicators 15 and 20 are provided with disks 106 and 107 respectively. These disks correspond to disks 81, 82 and 83 of Fig. 1. Each of disks 105, 106 and 107 is electrically connected to ground as indicated at 108, 109 and 110 respectively. Likewise, each disk is provided with a combined electrical contact and abutment member 111, 112 and 113 respectively. These contact members are adapted to engage brushes 114, 115 and 116 respectively fixed separately from contacts 111, 112 and 113.

Plungers 117, 118 and 119 are provided for movement into abutting relation with the several abutments. Each plunger is provided with an operating winding 120, 121 and 122. One terminal of each winding is connected to one of the brushes 114, 115 and 116. The other terminals of the windings are individually connected to back contacts 123, 124 and 125 normally engaged by an armature 126 associated with a marginal relay 127. A front contact 128 of relay 127 is connected to brush 114 for a purpose to be described hereinafter. Armature 126 is connected to one terminal of relay 127 and the opposite terminal of the relay is connected to a suitable source of current, such as a battery indicated at 130.

Operation of this embodiment of the invention is as follows. Marginal relay 127 operates when the current flow through its windings exceeds a predetermined value. Assume first that indicators 15 and 20 are out of alignment with each other and with antenna 10, and further, that antenna 10 leads indicator 15 which in turn leads indicator 20. If the elements are rotating in a clockwise direction, contact member 111 will engage member 114 and close a circuit through relay 127. However, the current flow through the circuit will not be sufficient to energize relay 127, although solenoid 120 will be energized to move plunger 117 into abutting relation with member 111 and stop rotation of disk 105 and antenna 10. Contact 112 next engages brush 115 energizing solenoid 121 and moving plunger 118 into abutment position with contact 112. When so connected, more current will flow through relay 127 through a parallel circuit, but still insufficient to cause operation of this relay. Finally, contact 113 will engage brush 116 energizing solenoid winding 122 and moving plunger 119 into abutting relation with contact 113. This additional increment of current flow through relay 127 will increase the total flow therethrough to a value sufficient to energize relay 127. Armature 126 will thereupon be moved out of engagement with contacts 123, 124 and 125, breaking the energizing circuits for solenoids 120, 121 and 122. Movement of antenna 10 and indicators 15 and 20, which are now aligned, will be resumed. At the same time, armature 126 engages front contact 128 to close a holding circuit for relay 127 through contact 111 until this contact has cleared plunger 117, at which time the holding circuit will be broken and armature 126 will move into engagement with its back contacts. The operation of relay 127 can be controlled for any desired current flow by provision of a suitable adjusting spring on the armature 126 as will be understood by those skilled in the art.

The described systems permit remote indications to be provided wherever desired, without exerting a torque upon the master or controlling member. This is true for the reason that each of the remote indicators is independently energized by its own motor, and the motors are maintained in substantial synchronism through the slip rings 55, 56 and 57. Additionally, in both embodiments of the invention, the alignment is either checked manually at desired intervals, or automatically at least once during each revolution cycle of the rotatable members.

While specific embodiments of the inevntion have been described to illustrate the application of the principles thereof, it will be understood by those skilled in the art that the invention may be otherwise embodied without departing from such principles.

What is claimed is:

1. A reset synchronizing system comprising, in combination a plurality of movable elements; a plurality of direct current motors each operatively associated with one of such movable elements; synchronizing connections between said motors; means effective to connect said motors to a source of direct current; and mechanism effective to arrest motion of each of said elements, during energization of said motors, at a predetermined point in its travel until said elements are in alignment.

2. A reset synchronizing system comprising, in combination a plurality of movable elements; a plurality of direct current motors each operatively associated with one of such movable elements; synchronizing connections between said motors; means effective to connect said motors to a source of direct current; reset means connected to such source; and mechanism operable by said reset means for stopping motion of each of said elements, during energization of said motors, at a predetermined point in its travel, said predetermined points being in coincidence.

3. A reset synchronizing system comprising, in combination a plurality of rotatable elements; a plurality of direct current motors each operatively associated with one of said rotatable elements; synchronizing connections between said motors; means effective to connect said motors to a source of direct current; an abutment member rotatable with each of said rotatable elements; stop means operatively associated with each abutment member; and reset means operable to position said stop means in the paths of said abutment members to arrest rotation of said elements, during energization of said motors, to align the same.

4. A reset synchronizing system comprising, in combination a plurality of rotatable elements; a plurality of direct current motors each operatively associated with one of said rotatable elements; synchronizing connections between said motors; means effective to connect said motors to a source of direct current; an abutment member rotatable with each of said rotatable elements; stop means operatively associated with each abutment member; and electrically energizable reset means connected to said source and operable, when energized, to position said stop means in the paths of said abutment members to arrest rotation of said elements, during energization of said motors, to align the same.

5. A reset synchronizing system comprising, in combination a plurality of rotatable elements; a plurality of direct current motors each operatively associated with one of said rotatable elements; synchronizing connections between said motors; means effective to connect said motors to a source of direct current; an abutment member rotatable with each of said rotatable elements; plungers each operatively associated with an abutment member; solenoid means operable when energized to position said plungers in the paths of said abutment members to arrest rotation of said elements, during energization of said motors, to align the same; and reset means operable to energize said solenoids.

6. A reset synchronizing system comprising, in combination a plurality of rotatable elements; a plurality of direct current motors each operatively associated with one of said rotatable elements; synchronizing connections between said motors; means effective to connect said motors to a source of direct current; an abutment member rotatable with each of said rotatable elements; plungers each operatively associated with an abutment member; solenoid means operable when energized to position said plungers in the paths of said abutment members to arrest rotation of said elements, during energization of said motors, to align the same; and reset means operable to connect said solenoids to said source to energize said solenoids.

7. A reset synchronizing system comprising, in combination a plurality of rotatable elements; a plurality of direct current motors each operatively associated with one of said rotatable elements; synchronizing connections between said motors; means effective to connect said motors to a source of direct current; a disk rotatable with each of said rotatable elements; an abutment member on each disk, said abutment members being aligned when said elements are aligned; stop means operatively associated with each abutment member; and reset means operable to position said stop means in the paths of said abutment members to arrest rotation of said elements to align the same.

8. A reset synchronizing system comprising, in combination a plurality of rotatable elements; a plurality of direct current motors each operatively associated with one of said rotatable elements; synchronizing connections between said motors; means effective to connect said motors to a source of direct current a disk rotatable with each of said rotatable elements; an abutment member on each disk, said abutment members being aligned when said elements are aligned; plungers each operatively associated with an abutment member; solenoid means operable when energized to position said plungers in the paths of said abutment members to arrest rotation of said elements to align the same; and reset means operable to energize said solenoids.

9. A system for maintaining alignment between a plurality of independently movable elements comprising, in combination, a plurality of reversible direct current motors each operatively associated with one of such movable elements; selectively operable means effective to connect said motors to a source of direct current for rotation in either direction; reset means connected to such source and said selectively operable means, said reset means being operative to energize said motors for rotation in one direction; and mechanism operable by said reset means for stopping rotation of each of said elements at a predetermined point in its travel, said predetermined points being in alignment.

10. A reset synchronizing system comprising, in combination a plurality of rotatable elements; a reversible direct current motor operatively associated with each of said rotatable elements; synchronizing connections between the motors; selectively operable means effective to connect said motors to such source for rotation in either direction; an abutment member rotatable with each of said rotatable elements; stop means operatively associated with each abutment member; and manually operable means connected to such source and effective to energize said motors for rotation in one direction and to position said stop means in the paths of said abutment members to arrest rotation of said elements to align the same.

11. A reset synchronizing system comprising, in combination a plurality of rotatable elements; a reversible direct current motor operatively associated with each of said rotatable elements; synchronizing connections between the motors; selectively operable means effective to connect said motors to such source for rotation in either direction; a disk rotatable with each of said rotatable elements; an abutment member on each disk, said abutment members being aligned when said elements are aligned; stop means operatively associated with each abutment member; and manually operable means connected to such source and effective to energize said motors for rotation in one direction and to position said stop means in the paths of said abutment members to arrest rotation of said elements to align the same.

12. A reset synchronizing system comprising, in combination a plurality of rotatable elements; a reversible direct current motor operatively associated with each of said rotatable elements; synchronizing connections between the motors; selectively operable means effective to connect said motors to such source for rotation in either direction; an abutment member rotatable with each of said rotatable elements; plungers each operatively associated with an abutment member; solenoid means operable when energized to position said plungers in the paths of said abutment members to arrest rotation of said elements to align the same; and manually operable reset means for energizing said motors for rotation in one direction and to energize said solenoids.

13. A reset synchronizing system comprising, in combination a plurality of rotatable elements; a plurality of motors each operatively associated with one of said rotatable elements; means effective to connect said motors to a source of current; an abutment member rotatable with each of said rotatable elements; stop means operatively associated with each abutment member; reset means automatically operable to position said stop means in the paths of said abutment members to arrest rotation of said elements to align the same; said reset means being automatically operative in response to alignment of said elements to withdraw said stop means from the paths of said abutment members.

14. A reset synchronizing system comprising, in combination a plurality of rotatable elements; a plurality of motors each operatively associated with one of said rotatable elements; means effective to connect said motors to a source of current; a disk rotatable with each of said rotatable elements; an abutment member on each disk, said abutment members being aligned when said elements are aligned; stop means operatively associated with each abutment member; reset means automatically operable to position said stop means in the paths of said abutment members to arrest rotation of said elements to align the same; said reset means being automatically operative in response to alignment of said elements to withdraw said stop means from the paths of said abutment members.

15. A reset synchronizing system comprising, in combination a plurality of rotatable elements; a plurality of motors each operatively associated with one of said rotatable elements; means effective to connect said motors to a source of current; a disk rotatable with each of said rotatable elements; an abutment member on each disk, said abutment members being aligned when said elements are aligned; plungers each operatively associated with an abutment member; solenoid means operable when energized to position said plungers in the paths of said abutment members to arrest rotation of said elements to align the same; and reset means automatically operable to energize said solenoids; said reset means being automatically operative in response to alignment of said elements to deenergize said solenoids.

WILLIAM P. LEAR.